United States Patent [19]

Shimizu et al.

[11] Patent Number: 5,004,917
[45] Date of Patent: Apr. 2, 1991

[54] RADIATION IMAGE INFORMATION READING APPARATUS

[75] Inventors: Kunimasa Shimizu; Masao Shigyo; Hiroshi Tanaka, all of Kanagawa, Japan

[73] Assignee: Fuji Photo Film Co., Ltd., Kanagawa, Japan

[21] Appl. No.: 508,678

[22] Filed: Apr. 12, 1990

[30] Foreign Application Priority Data

Apr. 17, 1989 [JP] Japan ................................. 1-96762

[51] Int. Cl.⁵ ................................................ H01J 3/14
[52] U.S. Cl. ................................. 250/236; 358/481
[58] Field of Search .................. 250/208.1, 234–236; 358/481, 484, 494, 496

[56] References Cited

U.S. PATENT DOCUMENTS 4,751,377 6/1988 Ishizaka et al. ................. 358/481
4,811,114 3/1989 Yamamoto et al. .............. 358/481
4,831,247 5/1989 Ishizaka ............................ 358/481

Primary Examiner—David C. Nelms
Assistant Examiner—Khaled Shami
Attorney, Agent, or Firm—Sughrue, Mion, Zinn, Macpeak & Seas

[57] ABSTRACT

A radiation image information reading apparatus photoelectrically reads radiation image information from a recording medium such as a stimulable phosphor sheet. Reading conditions and/or image processing conditions are established on the basis of the radiation image information which has been read from the recording medium. Whether the reading conditions and/or the image processing conditions fall outside of a predetermined range or not, is determined. If the reading conditions and/or the image processing conditions fall outside of the predetermined range, the radiation image information and data used to establish the reading conditions and/or the image processing conditions is held in storage.

4 Claims, 3 Drawing Sheets

RADIATION IMAGE INFORMATION READING APPARATUS

BACKGROUND OF THE INVENTION

The present invention relates to a radiation image information reading apparatus, and more particularly to a radiation image information reading apparatus which includes means for determining whether reading conditions and/or image processing conditions are appropriate or not when radiation image information is read from a stimulable phosphor sheet, for example, and processed for image display or recording.

There have recently been developed radiation image recording and reproducing systems for producing the radiation image of an object using a stimulable phosphor material capable of emitting light upon exposure to stimulating rays (see, for example, Japanese Laid-Open Patent Publications Nos. 55-12429, 55-103472, 55-116340, 55-87970, etc). These radiation image recording and reproducing systems are finding wider use particularly in the medical field. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam, so that the stimulable phosphor sheet emits light representative of the radiation image. The emitted light is then photoeectrically detected to produce an image information signal that is electrically processed for generating image information which is recorded as a visible image on a recording medium such as a photographic photosensitive material or displayed as a visible image on a display unit such as a CRT or the like.

Some radiation image recording and reproducing systems are arranged to effect preliminary and main reading modes. In the preliminary reading mode, a stimulable phosphor sheet with a recorded radiation image is scanned with a light beam of a lower level so that the recorded radiation image is roughly read from the stimulable phosphor sheet, and the obtained image signal is analyzed to produce optimum reading conditions which are best suited to the intensity of the radiation that was applied to the stimulable phosphor sheet at the time of recording the radiation image thereon. Thereafter, in the main reading mode, a light beam of a higher level is applied to the stimulable phosphor sheet to read the recorded radiation image under the optimum reading conditions, thereby generating a final image signal.

Other radiation image recording and reproducing systems, which may or may not have the preliminary and main reading modes of operation, analyze an obtained image signal (which may include an image signal produced in the preliminary reading mode) to determine optimum image processing conditions with which the image signal is to be processed. Such a process of determining optimum image processing conditions based on image signals is employed in not only radiation image recording and reproducing systems which utilize stimulable phosphor sheets, but also radiation image recording and reproducing systems in which image signals are derived from radiation images recorded on X-ray films or the like.

The arithmetic operations or processes (hereinafter referred to as "EDR (exposed data recognition) sequence") which determine reading conditions and/or image processing conditions based on image signals are governed by an algorithm which was established by an statistic analysis of a number of radiation images. If the radiation image of an object accidentally contains an image of a large thing, e.g., a protector of lead for protecting the object from exposure to the radiation, or if the radiation image of an object is to be recorded in a very special way, then the EDR sequence according to the statistically established algorithm may not be effectively carried out. If the EDR sequence is not effectively carried out, then the recorded radiation image is not read properly and/or the image signal is not processed properly. Any visible image which is reproduced on the basis of the improperly read radiation image or the improperly processed image signal tends to have a density or contrast problem. If the reproduced image is too poor to be corrected, then the radiation image has to be canceled and a new radiation image has to be recorded again, resulting in a waste of time. When the object is a human body, the double exposure to the radiation is not preferable since the total radiation dose received by the human body is doubled. The above problem rises also when the image reading apparatus in the system fails for some reason or when the algorithm of the EDR sequence is not suited to the conditions in which the radiation image is recorded.

Smooth and efficient operation of the radiation image recording and reproducing system requires the system to be backed up by a well established maintenance procedure. When a fault occurs in the radiation image recording and reproducing system, a serviceman inspects the system fault and repairs the defective part on site if possible. If the defective device cannot be repaired on site, then it is replaced with a new device by the serviceman.

If the fault in the system cannot be located by the serviceman in the inspection procedure, then it is not possible for the serviceman to identify the defective part to be repaired or replaced on site. When this happens, the radiation image recording and reproducing system will not be available for service over a long period of time. Therefore, it is desirable to find any faulty part quickly if a system fault occurs.

SUMMARY OF THE INVENTION

It is a major object of the present invention to provide a radiation image information reading apparatus which can determine whether reading conditions and/or image processing conditions obtained on the basis of image information fall within a predetermined range, and hold the image information and data to be used to establish the conditions if the reading conditions and/or image processing conditions do not fall within the predetermined range, so that any faulty part can be found quickly and the system can be recovered quickly from any failure.

Another object of the present invention is to provide a radiation image information reading apparatus for photoelectrically reading radiation image information from a recording medium which stores the radiation image information, comprising processing means for establishing reading conditions and/or image processing conditions based on the radiation image information which has been read from the recording medium, determining means for determining the reading conditions and/or the image processing conditions fall outside of a predetermined range or not, and storage means for holding the radiation image information and data used to establish the reading conditions and/or the image processing conditions if the reading conditions and/or the image processing conditions fall outside of the predetermined range.

Still another object of the present invention is to provide the radiation image information reading apparatus wherein the processing means and the determining means comprise central processing units, respectively.

Yet another object of the present invention is to provide the radiation image information reading apparatus further including display means for displaying a processed signal, the display means being connected to one or both of the processing means and the determining means.

A further object of the present invention is to provide the radiation image information reading apparatus further including a cassette tape recorder and/or a floppy disk drive for storing a processed signal, the cassette tape recorder and/or the floppy disk drive being connected to one or both of the processing means and the determining means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
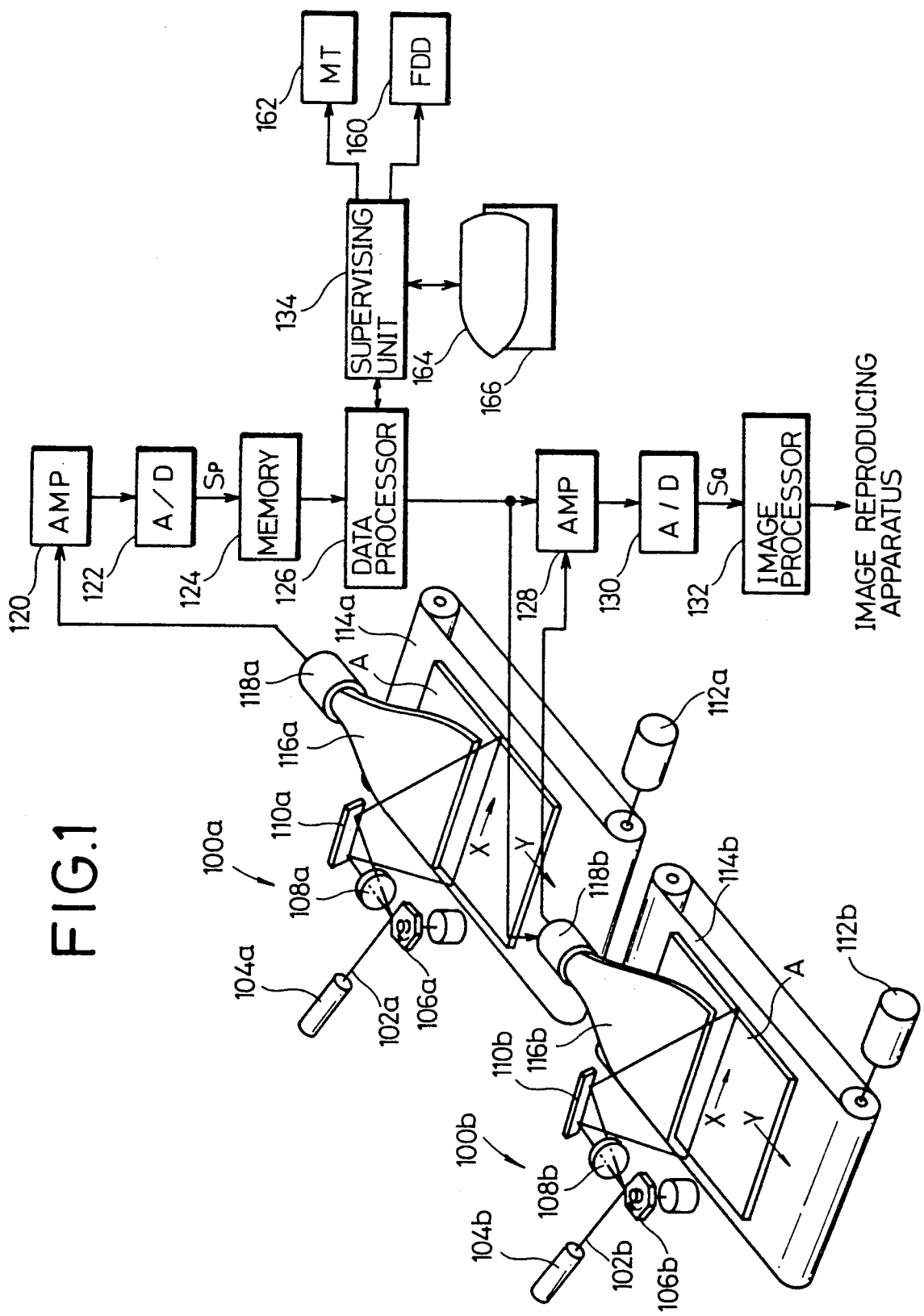
FIG. 1 is a schematic perspective view, partly in block form, of a radiation image information reading apparatus according to the present invention.

FIG. 1 shows a radiation image information reading apparatus according to the present invention. The radiation image information reading apparatus includes a preliminary reading mechanism 100a for reading radiation image information recorded on a stimulable phosphor sheet A and establishing reading conditions based on the radiation image information thus read, in a preliminary reading mode, and a main reading mechanism 100b for reading the radiation image information according to the established reading conditions in a main reading mode.

The preliminary reading mechanism 100a comprises a laser beam source 104a for emitting a weaker laser beam 102a, a rotating polygonal mirror 106a for deflecting the laser beam 104a at high speed, a condenser lens 108a which may be an fθ lens, and a mirror 110a. The laser beam 102a which is deflected by the polygonal mirror 106a passes through the condenser lens 108a, and is reflected by the mirror 110a, thereby scanning the stimulable phosphor sheet A in the main scanning direction indicated by the arrow X. At the same time, the stimulable phosphor sheet A, which is placed on a sheet feeder 114a which comprises a feed belt and rollers, is fed in the auxiliary scanning direction indicated by the arrow Y by the sheet feeder 114a which is actuated by a motor 112a. A light guide 116a is positioned above the sheet feeder 114a and has an entrance end disposed close to the stimulable phosphor sheet A and extending along the main scanning direction (indicated by the arrow X). The light guide 116a also has an exit end optically coupled to the detecting surface of a photomultiplier 118a, which serves as a light detector.

The main reading mechanism 100b is of essentially the same construction as that of the preliminary reading mechanism 100a, except that a laser beam 102b emitted from a laser beam source 104b is stronger in intensity than the laser beam 102a. The components of the main reading mechanism 100b, which are identical to those of the preliminary reading mechanism 100a, are denoted by identical reference numerals with a suffix b, and will not be described in detail.

The photomultiplier 118a is electrically connected to an amplifier 120 which amplifies photoelectrically converted radiation image information. The image information which has been amplified by the amplifier 120 is converted by an A/D converter 122 into digital data, which are then stored as preliminary image data SP in a memory 124. Then, the preliminary image data SP are processed by a data processor 126 so that reading conditions are established. Radiation image information read by the main reading mechanism 100b is amplified by an amplifier 128 according to the reading conditions established by the data processor 126. The amplified image information is converted by an A/D converter 130 into digital data, which are sent as main image data SQ to an image processor 132. The image processor 132 processes the main image data SQ and transfers the processed main image data SQ to an image reproducing apparatus (not shown).

Figure 2:
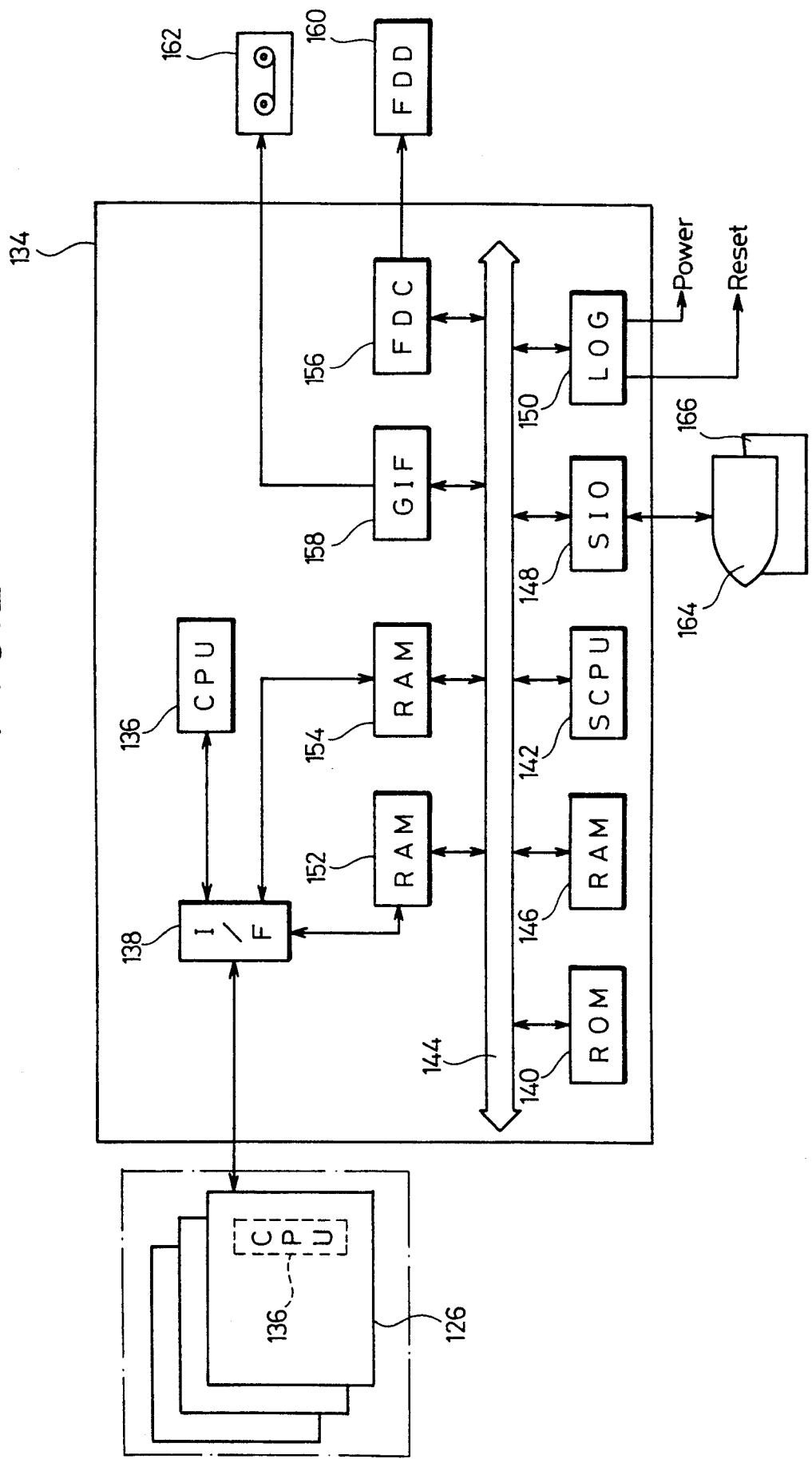
FIG. 2 is a block diagram of a monitoring unit in the radiation image information reading apparatus shown in FIG. 1.

To the data processor 126, there is connected a supervising unit 134 which is shown in detail in FIG. 2. The supervising unit 134 serves to determine whether the reading conditions established by the data processor 126 are acceptable or not. Depending on whether the reading conditions are acceptable or not, the supervising unit 134 holds the reading conditions and the preliminary image data SP.

The supervising unit 134 is essentially in the form of a circuit board which can be connected to the data processor 126 when required. When the supervising unit 134 is connected to the data processor 126, a central processing unit (CPU) 136 for controlling operation of the data processor 126 is removed from the data processor 126 and mounted on the circuit board of the supervising unit 134. The data processor 126 and the supervising unit 134 are connected to each other by a flexible cable or the like through an interface ((I/F) 138.

The operation of the supervising unit 134 for monitoring the reading conditions is controlled by a supervising CPU (SCPU) 142 according to a supervising program stored in a ROM 140. The supervising unit 134 has a bus line 144 to which there are connected the ROM 140, the SCPU 142, a RAM 146 for storing supervising data, a serial input/output port (SIO) 148, a logic circuit 150, a RAM 152 serving as a frame memory, a RAM 154, a floppy disk controller (FDC) 156, and a general-purpose interface (GI/F) 158. The FDC 156 is connected to a floppy disk drive (FDD) 160 for recording instructed data, and the GI/F 158 is connected to a cassette tape recorder 162 for recording instructed data.

The RAM 152 serves to store the preliminary image data SP. The RAM 154 serves to record status data such as processing addresses and instructions for the CPU 136, and also to store reading conditions, histogram data for establishing the reading conditions, interim results of arithmetic operations, and image processing conditions. The SIO 148 is connected to a display unit 164 for displaying system faults, and a keyboard 166 for entering data. The logic circuit 150 is supplied with signals from a reset terminal and a power supply switch.

The radiation image information reading apparatus according to the present invention is basically constructed as described above. Operation of the radiation image information reading apparatus will be described below.

The stimulable phosphor sheet A on which a radiation image is recorded is first set in position in the preliminary reading mechanism 100a. The stimulable phosphor sheet A is fed in the auxiliary scanning direction indicated by the arrow Y by the sheet feeder 114a actuated by the motor 112a. At the same time, the weaker laser beam 102a which is emitted from the laser beam source 104a is reflected and deflected by the polygonal mirror 106a which is rotating at high speed in the direction indicated by the arrow, passes through the condenser lens 108a, and is reflected by the mirror 110a toward the stimulable phosphor sheet A, which is now scanned with the laser beam 102a in the main scanning direction indicated by the arrow X that is substantially normal to the auxiliary scanning direction. When the laser beam 102a, serving as a stimulating beam, is applied to the stimulable phosphor sheet A, the stimulable phosphor sheet A emits a part of the stored radiation energy in the form of light whose intensity corresponds to the radiation image information recorded on the sheet A. The emitted light is guided by the light guide 116a to the photomultiplier or multiplier phototube 118a which photoelectrically detects the applied light.

An analog output signal produced by the photomultiplier 118a is amplified by the amplifier 120 and then converted by the A/D converter 122 into digital data as preliminary image data SP. In the above preliminary reading mode, the voltage applied to the photomultiplier 118a and the amplification factor of the amplifier 120 are selected such that the radiation energy stored in the stimulable phosphor sheet A can be read in a wide spectrum.

The preliminary image data SP is stored in the memory 124 and then read into the data processor 126 which determine reading conditions to be used in the main reading mode. The voltage to be applied to the photomultiplier 118b and the amplification factor of the amplifier 128 are controlled according to the reading conditions thus established.

After the preliminary reading mode, the stimulable phosphor sheet A is set in place in the main reading mechanism 100B. The stimulable phosphor sheet A is then scanned with the laser beam 102b which is stronger in intensity than the laser beam 102a. The radiation image information read from the stimulable phosphor sheet A is represented by an output signal from the photomultiplier 118b. The output signal from the photomultiplier 118b is then amplified according to the reading conditions by the amplifier 128, and the amplified signal is converted by the A/D converter 130 into digital data as main image data SQ. The main image data SQ are then sent to and processed by the image processor 132. The processed image data are then delivered as an image signal to the image reproducing apparatus, which reproduces and displays the radiation image.

The radiation image information reading apparatus, which is installed in the user's place, may suffer a fault when it is operated on trial while being connected to a maintenance interface or when it in actual use. If the radiation image information reading apparatus is subjected to a fault when it is in use, a jump is made in the processing program to a certain address therein, thus putting the apparatus in a HALT condition. The user then attempts to switch on the apparatus in order to recover the apparatus from the fault. If the apparatus fails to recover, then the user calls a serviceman. If the apparatus suffers a fault when it is operated on trial, then the apparatus is also put in the HALT condition.

If it cannot be determined whether the fault has occurred in the exposure system of the apparatus, the algorithm of the EDR sequence, or the hardware system of the apparatus, then the serviceman connects the supervising unit 134, as a maintenance control board, shown in FIG. 2 to the data processor 126. More specifically, the serviceman removes the CPU 136 from the data processor 126, mounts the CPU 136 on the circuit board of the supervising unit 134, and connects the supervising unit 134 and the data processor 126 to each other by a flexible cable or the like through the I/F 138.

Then, the serviceman switches on the radiation image information reading apparatus again to continue normal operation thereof. The preliminary image data SP which are produced by the preliminary reading mechanism 100a are sent through the I/F 138 and stored in the RAM 152. The CPU 136 carries out the EDR sequence based on the preliminary image data SP. Reading conditions such as histogram data and interim results of arithmetic operations, produced by the EDR sequence, are sent through the I/F 138 and stored in the RAM 154. The SCPU 142 in the supervising unit 134 then determines whether the reading conditions fall outside of a predetermined reference range, i.e., are of an abnormal value.

Figure 3:
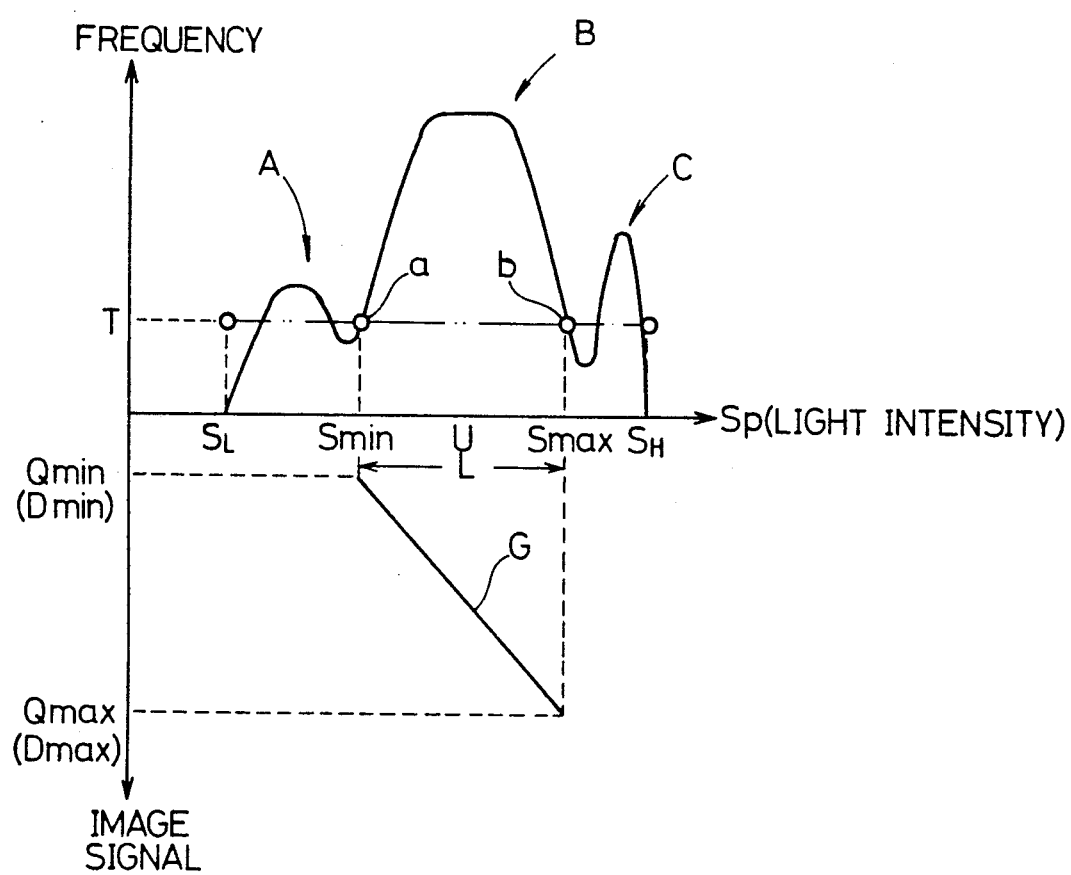
FIG. 3 is a diagram showing a histogram of image information.

FIG. 3 shows a histogram which is obtained from most (e.g., 99.5%) of radiation images which lend themselves to the EDR sequence. The preliminary image data SP, which are obtained when the light emitted from the stimulable phosphor sheet A are read in the preliminary reading mode and which are proportional to the emitted light, are represented by a horizontal axis (logarithmic axis). The frequency with which the preliminary image data SP are produced, i.e., how frequently the preliminary image data SP are produced, is indicated by an upper half of a vertical axis, and the image signal obtained in the main reading mode is indicated by a lower half of the vertical axis (logarithmic axis). The histogram which is derived from the preliminary image data SP is mainly composed of three class intervals A, B, C. It is assumed here that the necessary radiation image corresponds to the class interval B. In order to locate the class interval B, the frequency is searched at a threshold T (along the two-dot-and-dash line) from a minimum value SL of the preliminary image data SP in the direction in which the value of the preliminary image data SP increases, until a second positive-going point a and a next negative-going point b. Maximum and minimum values of the preliminary image data SP which are present between the points a, b are indicated respective by Smax (corresponding to the point b) and Smin (corresponding to the point a). The logarithmic difference (latitude) between the maximum and minimum values Smax, Smin is given by:

$$L = \log Smax - \log Smin$$

The average of the preliminary image data SP in the class interval B is expressed by:

$$U = \frac{\log Smax + \log Smin}{2}$$

and the sensitivity S is defined as:

$$S = 4 \times 10^{(4-U)}$$

The data processor 126 establishes a straight line G which is inclined such that the maximum and minimum values Smax, Smin of the preliminary image data SP correspond respectively to maximum and minimum image signals Qmax, Qmin in the main reading mode which represent maximum and minimum densities Dmax, Dmin of a visible output image in an appropriate density range. The reading conditions in the main reading mode, i.e., the gain and scale factor of the amplifier 128, are derived from the straight line G.

The SCPU 142 in the supervising unit 134 determines whether the latitude L and the sensitivity S fall in a reference range or not under exposure conditions used in the user's place based on the data stored in the RAM 154. If the latitude L and the sensitivity S are not in the reference range, then the SCPU 142 stores the reading conditions, i.e., the histogram data and interim results of arithmetic operations, stored in the RAM 154, and the preliminary image data stored in the RAM 152, into a floppy disk through the FDC 156 and the FDD 160, or records the reading conditions and the preliminary image data on a cassette magnetic tape in the cassette tape recorder 162.

Then, the cassette magnetic tape is sent to an analyzing center in which the reading conditions and data recorded on the magnetic tape are analyzed to determine whether the fault is in the exposure system of the apparatus, the EDR sequence algorithm, or the hardware system of the apparatus.

When supplied with the result of the analysis, the serviceman repairs the faulty part or replaces it with a new component. The reference range for the latitude L and the sensitivity S can be recognized more accurately when certain many exposures are taken by the apparatus.

In the illustrated embodiment, the radiation image information reading apparatus includes the preliminary reading mechanism 100a and the main reading mechanism 100b. However, the preliminary and main reading modes can be effected by only the preliminary reading mechanism 100a. More specifically, after the stimulable phosphor sheet A is scanned with the weaker laser beam 102a in the preliminary reading mode, the stimulable phosphor sheet A is returned to its original position in the preliminary reading mechanism 100a, and then scanned with the stronger laser beam 102a in the main reading mode. While the reading conditions for the main reading mode are established in the preliminary reading mode in the above embodiment, image processing conditions required for gradation processing, frequency processing, etc. may also be established on the basis of the preliminary image data, and the data used to establish the image processing conditions may be held depending on whether the image processing conditions fall within a predetermined range or not.

The present invention has been described with respect to the radiation image information apparatus which performs the preliminary reading mode. However, the principles of the invention are also applicable to a radiation image information processing apparatus in which no preliminary reading mode is effected but only the main reading mode is carried out. In such a modification, radiation image information is read under preset reading conditions to produce main image data SQ, image processing conditions are established by the data processor 126 based on the main image data SQ, and the image information is processed as desired in the image processor 132 according to the established image processing conditions. The supervising unit 134 connected to the data processor 126 stores the main image data SQ and the image processing conditions in the RAMs 152, 154, and records them in the floppy disk or the cassette magnetic tape for subsequent analysis. The present invention is also applicable to a radiation image information reading apparatus which employs an X-ray film or the like as an information storage medium, rather than the stimulable phosphor sheet A.

With the present invention, as described above, if the reading conditions and/or the image processing conditions, which have been established on the basis of radiation image information read from a recording medium, fall outside of a predetermined range, then the radiation image information and data used to establish the conditions are recorded. Any fault which the radiation image information reading apparatus may have can be located when the recorded data are analyzed. The result of the analysis allows the serviceman to locate the fault and repair or replace the faulty part quickly, so that any downtime of the radiation image information reading apparatus can be shortened.

Although a certain preferred embodiment has been shown and described, it should be understood that many changes and modifications may be made therein without departing from the scope of the appended claims.

What is claimed is:

1. A radiation image information reading apparatus for photoelectrically reading radiation image information from a recording medium which stores the radiation image information, comprising:

processing means for establishing reading conditions and/or image processing conditions based on the radiation image information which has been read from the recording medium;

determining means for determining whether said reading conditions and/or said image processing conditions fall outside of a predetermined range or not; and storage means for holding the radiation image information and data used to establish the reading conditions and/or the image processing conditions if the reading conditions and/or the image processing conditions fall outside of said predetermined range.

2. A radiation image information reading apparatus according to claim 1, wherein said processing means and said determining means comprise central processing units, respectively.

3. A radiation image information reading apparatus according to claim 1, further including display means for displaying a processed signal, said display means being connected to one or both of said processing means and said determining means.

4. A radiation image information reading apparatus according to claim 1, further including a cassette tape recorder and/or a floppy disk drive for storing a processed signal, said cassette tape recorder and/or said floppy disk drive being connected to one or both of said processing means and said determining means.

* * * * *